UNITED STATES PATENT OFFICE.

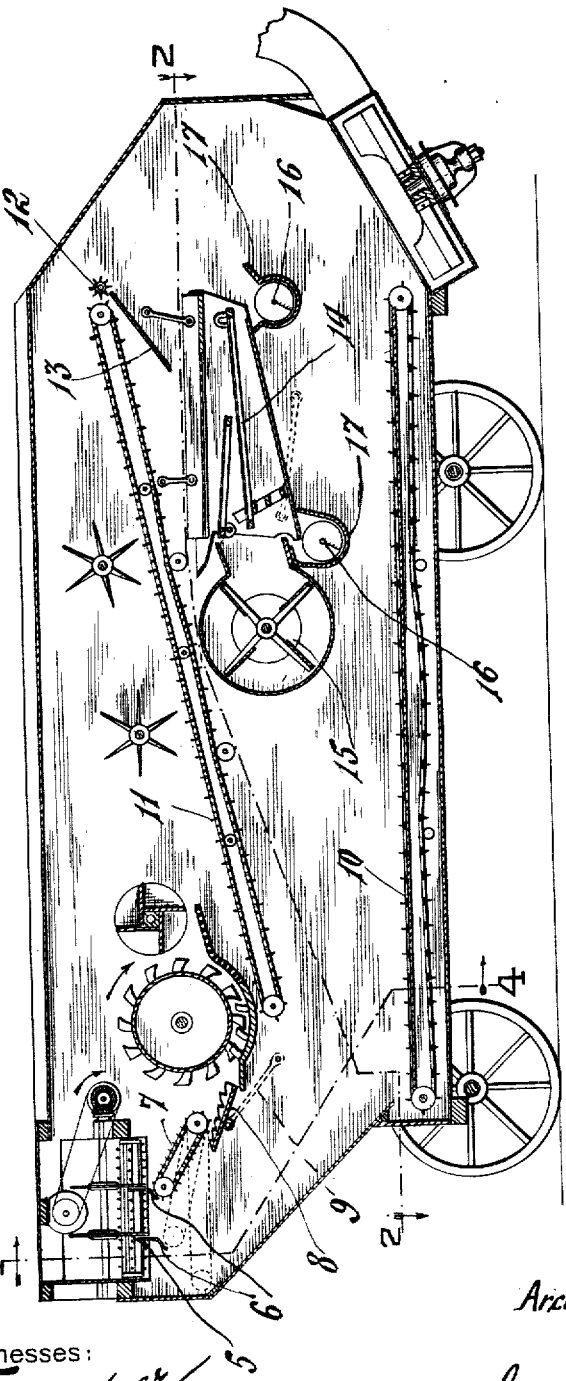

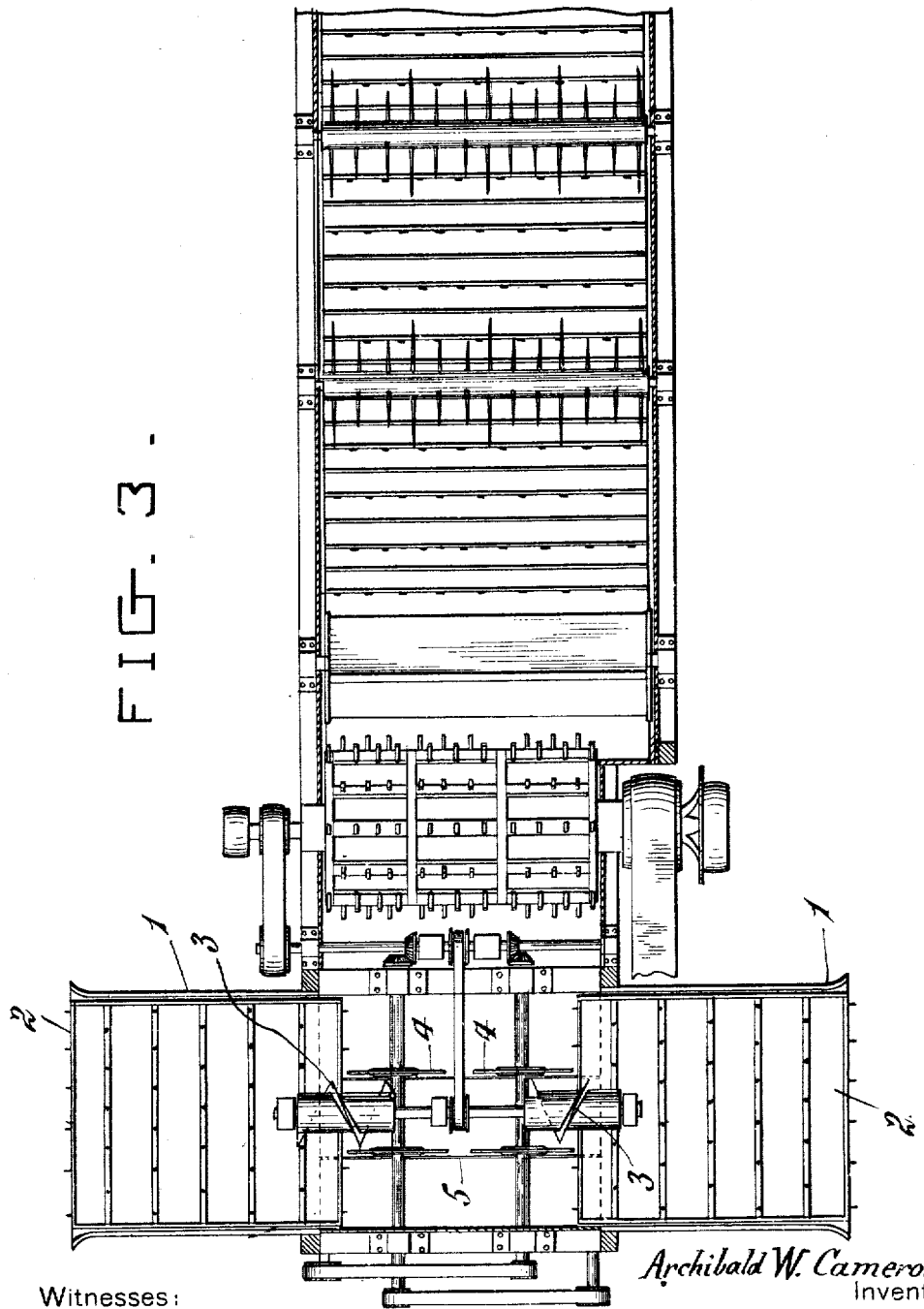

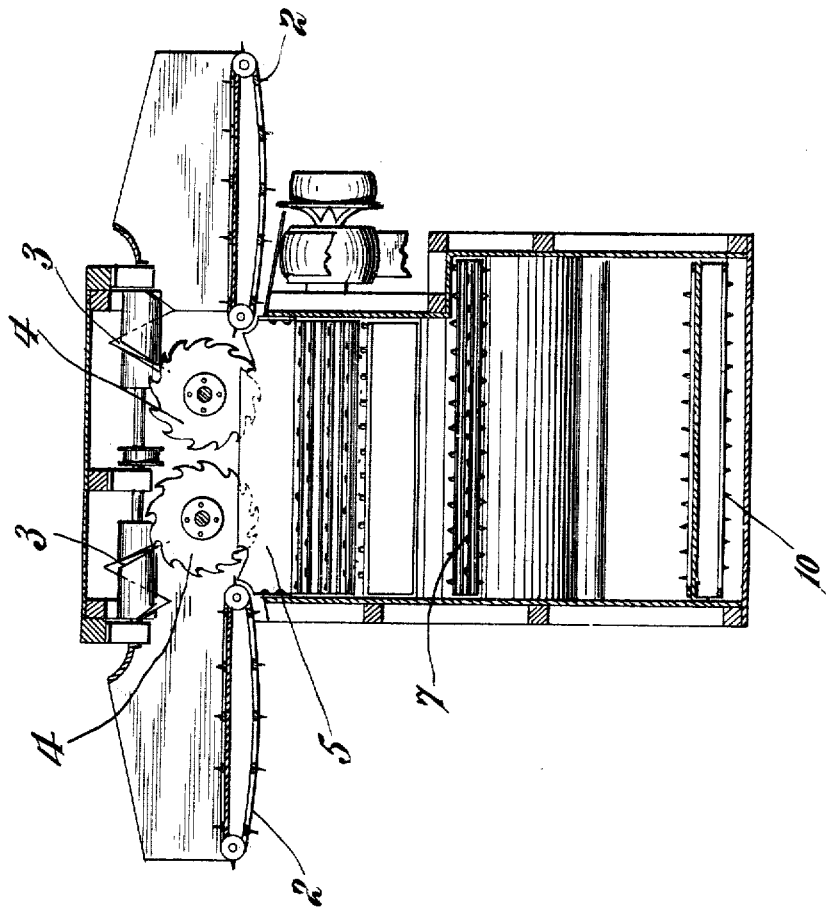

ARCHIBALD WILLIAM CAMERON, OF CONDIE, SASKATCHEWAN, CANADA.

THRESHING-MACHINE.

952,700.

Specification of Letters Patent. Patented Mar. 22, 1910.

Application filed December 28, 1908. Serial No. 469,519.

*To all whom it may concern:*

Be it known that I, ARCHIBALD WILLIAM CAMERON, a subject of the King of Great Britain, residing at Condie, in the Province of Saskatchewan, Canada, have invented certain new and useful Improvements in Threshing-Machines; and I do hereby declare that the following is a full, clear, and exact description of the invention, such as will enable others skilled in the art to which it appertains to make and use the same.

The invention to be hereinafter described relates to threshing machines, and particularly to mechanism to be used for cutting or opening bundles of grain, and a mechanism for cutting or heading the straw after the bundles are opened.

In order to more clearly disclose the construction, operation and use of the invention, reference should be had to the accompanying drawings forming part of the present application.

Throughout the several figures of the drawings, like reference characters designate the same parts.

In the drawings: Figure 1 is a vertical longitudinal view, taken centrally through the machine; Fig. 2 is a horizontal longitudinal section on line 2—2 of Fig. 1, looking in the direction of the arrow; Fig. 3 is a plan view of the machine, with the top cover cut away; and, Fig. 4 is a vertical cross section, on line 4—4 of Fig. 1.

The body and general framework of the machine may be of usual and well known construction, as may also the threshing cylinder and concave coöperating therewith, the beater, the straw tedders over the conveying belt, and the pneumatic straw conveyer or stacker.

Above and in advance of the threshing cylinder, the frame of the machine is provided with two lateral extensions 1, in which are mounted belt conveyers 2 adapted to receive and convey the bundles of grain beneath revolving spiral knives 3, which cut the binding twine and allow the bundles to open out. Directly in the path of the straw are mounted a plurality of parallel circular straw cutting knives 4, which cut the straw into short lengths, so that only a small portion of the straw will accompany the heads. As the straw is cut, it drops through the space between the belt conveyers. This space is divided into three sections by two parallel partitions 5, which are formed with outwardly turned deflecting portions 6, for a purpose to be later disclosed.

The portion of the straw carrying the heads will fall upon an inclined belt conveyer 7, the lower end of which projects above a reciprocating feed board 8. This feed board may consist of a single board provided with a plurality of teeth for gripping the straw, or it may comprise a plurality of separate feed bars connected together, as desired. It is pivotally supported, as by a link 9, connected to each of its ends, and the thresher frame respectively. Any suitable mechanism, as eccentrics or the like, may be used for imparting a reciprocating motion to it. The conveyer 7 should be made adjustable, so that it may be extended clear across the space between the upper ends of the straw conveyers 2 to receive and deliver all the straw to the feed board 8, if desired. For this purpose, the ends of the upper drive shaft of the conveyer 8 may be mounted in any suitable kind of adjustable bearings and belts of different lengths may be used for the several adjustments, as indicated in dotted lines. Such straw as does not fall on the conveyer 7, drops to the rear inclined wall of the machine frame, and slides down it onto the straw conveyer 10, which delivers it to the usual casing of a well known form of pneumatic straw stacker.

The threshed straw and free grain pass from the concave onto a long traveling conveyer 11, made up of a plurality of very small troughs flexibly connected. These troughs, of course, are adapted to receive and convey the loose grain. At the end of the conveyer 11 is mounted a straw roller 12, having a plurality of outwardly projecting tines. The adjacent surfaces of this roller and the conveyer 11 travel in the same direction. Consequently, the straw passing over the upper end of the conveyer is caught by the roller and lifted therefrom, so that it falls onto the straw conveyer 10 below and is carried to the casing of the pneumatic stacker, as in the case of the unthreshed straw. The successive troughs of the conveyer are inverted as they pass from the upper to the lower run of the conveyer, and as such inversion takes place, the grain will be dumped upon the inclined plate 13, from which it will pass successively over the perforated plates of the reciprocable riddle 14, which coöperates with a fan or blower 15 to separate the chaff from the grain. At opposite ends of the riddle and directly below the same, are mounted the screw conveyers 16, in suitable casings 17, and adapted to deliver the grain from the riddle to the outside of the machine.

Suitable belt and pulley or gearing connections may be used for driving the several parts of the machine, as clearly shown. Such driving means form no part of the present invention, and may be readily applied by any one skilled in the art.

It is thought that the operation, use and construction of the invention will be clear from the preceding detailed description.

Having thus fully described my invention, what I claim as new, and desire to secure by Letters Patent, is:—

In combination with a threshing machine of the character described, straw cutting knives adapted to cut the straw into short lengths as it is delivered to the machine for threshing, and partitions provided with outwardly turned portions adapted to deflect the headless lengths toward the rear of the thresher casing.

In witness whereof I have hereunto set my hand in the presence of two witnesses.

ARCHIBALD WILLIAM CAMERON.

Witnesses:
JOHN D. MARTIN,
HAROLD F. THOMSON.